United States Patent
Decrop et al.

(10) Patent No.: US 12,204,296 B2
(45) Date of Patent: Jan. 21, 2025

(54) DYNAMIC MITIGATION OF FAN NOISE DURING E-CONFERENCE BASED ON REAL-TIME AND RETROACTIVE DATA

(71) Applicant: INTERNATIONAL BUSINESS MACHINES CORPORATION, Armonk, NY (US)

(72) Inventors: Clement Decrop, Arlington, VA (US); Zachary A. Silverstein, Georgetown, TX (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 17/454,881

(22) Filed: Nov. 15, 2021

(65) Prior Publication Data

US 2023/0152758 A1 May 18, 2023

(51) Int. Cl.
*G05B 13/04* (2006.01)
*G06F 1/20* (2006.01)
*H04R 29/00* (2006.01)

(52) U.S. Cl.
CPC ............ *G05B 13/041* (2013.01); *G06F 1/20* (2013.01); *H04R 29/004* (2013.01)

(58) Field of Classification Search
CPC ......... G05B 13/041; G06F 1/20; G06F 1/206; H04R 29/004
See application file for complete search history.

(56) References Cited

U.S. PATENT DOCUMENTS 7,941,231 B1 5/2011 Dunn
8,331,577 B2 12/2012 Lyon
(Continued)

FOREIGN PATENT DOCUMENTS

CN 100407100 C 7/2008
WO WO-2022260666 A1 * 12/2022

OTHER PUBLICATIONS

Anonymous, "IBM and Cisco Solutions," CISCO, Accessed: Sep. 9, 2021, https://www.cisco.com/c/en/us/solutions/global-partners/ibm.html, 7 pages.
(Continued)

*Primary Examiner* — Christopher E. Everett
(74) *Attorney, Agent, or Firm* — Anthony M. Pallone (57) ABSTRACT

According to one embodiment, a method, computer system, and computer program product for mitigating computer fan noise. The embodiment may include retrieving a previously generated baseline profile for a user participating in a real-time e-conference call via a computing device. The embodiment may include identifying real-time hardware and software metrics of the computing device. The embodiment may include calculating a current fan indicative noise (FIN) score for the call based on the baseline profile and the identified metrics. The embodiment may include determining whether the current FIN score is above a threshold value. In response to determining that the FIN score is above a threshold value, the embodiment may include determining whether the computing device is at risk of damage. In response to determining that the computing device is not at risk of damage, the embodiment may include limiting operation of one or more fans of the computing device.

17 Claims, 6 Drawing Sheets

(56) References Cited

U.S. PATENT DOCUMENTS

| | | | |
|---|---|---|---|
| 2008/0307238 A1* | 12/2008 | Bieswanger | G06F 1/206 |
| | | | 713/300 |
| 2009/0002939 A1* | 1/2009 | Baugh | G06F 1/206 |
| | | | 361/679.48 |
| 2009/0092261 A1* | 4/2009 | Bard | G06F 1/3203 |
| | | | 381/71.1 |
| 2013/0289792 A1* | 10/2013 | Cheng | G06F 1/206 |
| | | | 700/300 |
| 2013/0332159 A1 | 12/2013 | Federighi | |
| 2016/0013745 A1 | 1/2016 | North | |
| 2016/0171967 A1 | 6/2016 | Giaimo, III | |
| 2020/0133358 A1* | 4/2020 | Mishra | G06V 40/10 |
| 2021/0149465 A1 | 5/2021 | Hiltner | |

OTHER PUBLICATIONS

Mell et al., "The NIST Definition of Cloud Computing", National Institute of Standards and Technology, Special Publication 800-145, Sep. 2011, 7 pages.

\* cited by examiner

DYNAMIC MITIGATION OF FAN NOISE DURING E-CONFERENCE BASED ON REAL-TIME AND RETROACTIVE DATA

BACKGROUND

The present invention relates generally to the field of computing, and more particularly to electronic-conference (e-conference) calls and computing device fan operation.

A computer fan is any fan inside, or attached to, a computer case used for active cooling. Fans are used to draw cooler air into the case from the outside, expel warm air from inside the case, and move air across a heat sink to cool a particular component, for example a central processing unit (CPU) or a graphics processing unit (GPU). Both axial and sometimes centrifugal (blower/squirrel-cage) fans are used in computers. Computer fans are commonly implemented in standard sizes and are powered and controlled using 3-pin or 4-pin fan connectors. Noise from a computer fan has been found to be roughly proportional to the fifth power of fan speed. Some axial fans may rotate at speeds of up to around 38,000 revolutions per minute (RPM) for smaller sizes. Computer fans may be controlled by sensors and circuits that reduce their speed when internal computer temperature is not high.

SUMMARY

According to one embodiment, a method, computer system, and computer program product for mitigating computer fan noise. The embodiment may include retrieving a previously generated baseline profile for a user. The user is participating in a real-time e-conference call via a computing device. The embodiment may include identifying real-time hardware and software metrics of the computing device. The embodiment may include calculating a current fan indicative noise (FIN) score for the real-time e-conference call based on evaluation of the previously generated baseline profile and the identified real-time hardware and software metrics. The embodiment may include determining whether the current FIN score is above a threshold value. In response to determining that the current FIN score is above a threshold value, the embodiment may include determining whether the computing device is at risk of damage. In response to determining that the computing device is not at risk of damage, the embodiment may include limiting operation of one or more fans of the computing device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to electronic-conference (e-conference) calls and computing device fan operation. The following described exemplary embodiments provide a system, method, and program product to, among other things, determine a fan indicative noise (FIN) level of a user's computer during an e-conference call and, accordingly, partially or completely, deactivate the fan of the user's computer when the user speaks on the e-conference call. Therefore, the present embodiment has the capacity to improve the technical fields of e-conference calls and computing device fan operation by dynamically reducing or eliminating the noise produced by a fan of the user's computer, thus mitigating disturbing fan noise and promoting intelligibility of a user's audio during an e-conference.

As previously described, a computer fan is any fan inside, or attached to, a computer case used for active cooling. Fans are used to draw cooler air into the case from the outside, expel warm air from inside the case, and move air across a heat sink to cool a particular component, for example a CPU or a GPU. Both axial and sometimes centrifugal fans are used in computers. Computer fans are commonly implemented in standard sizes and are powered and controlled using 3-pin or 4-pin fan connectors. Noise from a computer fan has been found to be roughly proportional to the fifth power of fan speed. Some axial fans may rotate at speeds of up to around 38,000 RPM for smaller sizes. Computer fans may be controlled by sensors and circuits that reduce their speed when internal computer temperature is not high.

E-conferencing is a method of holding meetings with others in different locations via the Internet. While one of the most important benefits of e-conferencing is the reduction in travel time and operational costs incurred in conducting in-person meetings, businesses can employ e-conferencing to improve productivity and efficiency by speeding up decision-making, solving problems faster, and collaborating more easily. A user can set up or join an e-conference by using software on a desktop computer, laptop or tablet computer linked to the Internet. The user can speak and listen during an e-conference by using a microphone and speakers attached to the computer or by telephone. When communicating over e-conferences on a laptop, it is not uncommon for the user to deal with not just noisy background audio, but also a noisy computer itself. In fact, one of the loudest sources of noise the user may have to deal with is their laptop's fan. A computer using CPU and GPU cooling fans can together generate over 60 decibels (dBA), an amount similar in noise to a lawn mower at 10 meters away. As such, the noise from the user's laptop, or other computing device, may interfere with and negatively affect the intelligibility of the user's audio (e.g., the user's speech) when communicating in an e-conference. Consequently, the benefits and effectiveness of the e-conference may be reduced. It may therefore be imperative to have a system in place to analyze and identify fan indicative noise of a laptop which is negatively affecting intelligibility of a user's transmitted audio in an e-conference and mitigate the noise produced by the fan while the user is communicating during the e-conference. Thus, embodiments of the present invention may be advantageous to, among other things, analyzing laptop fan noise and other hardware metrics (e.g., internal temperature) produced during an e-conference, identifying when the fan noise is adversely affecting intelligibility of a user's audio, mitigating (partially or completely) the noise produced by the fan when the user speaks during the e-conference while ensuring that the laptop is not at risk of overheating. The present invention does not require that all advantages need to be incorporated into every embodiment of the invention.

According to at least one embodiment, when a user joins an e-conference call a baseline profile containing computing system hardware metrics, average fan noise levels, and past e-conference behavior of the user may be retrieved. A fan indicative noise (FIN) score may be calculated for the current e-conference call. If the FIN score for the current e-conference call is above a threshold, the proposed system may mitigate operation of the fan when the user speaks during the e-conference call provided that the computing system is not at risk of damage. According to at least one other embodiment, if the past e-conference behavior of the user indicates spot unmuting behavior, the proposed system may mitigate operation of the fan when the user unmutes their computing system to speak during the e-conference provided that the computing system is not at risk of damage. According to at least one further embodiment, a presenter group of computing systems may be created and during an e-conference call a computing system of the group may be identified as an optimal system for presentation use based on an evaluation of each computing system's fan decibel level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify laptop fan noise which is negatively impacting intelligibility of a user's audio feed when communicating during an e-conference call and mitigate the fan noise when the user is communicating or is unmuted during the e-conference call. The system, method, and program product additionally determines whether or not the laptop is at risk of overheating before implementing fan noise mitigation actions.

Figure 1:
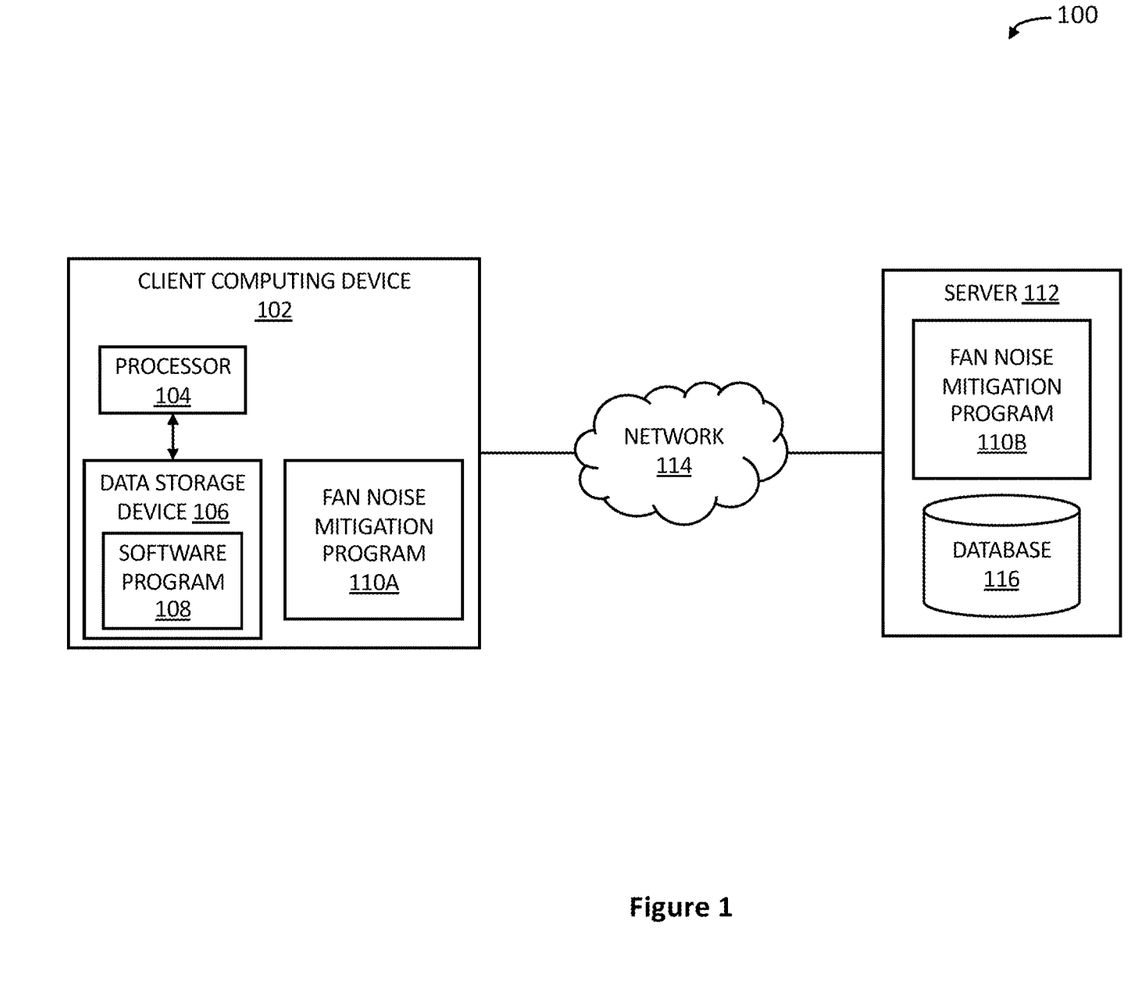
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102 and a server 112, interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each host a fan noise mitigation program 110A, 110B. In one or more other embodiments, the fan noise mitigation program 110A, 110B may be partially hosted on client computing device 102 and server 112 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a fan noise mitigation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing capable of running a program and accessing a network. Additionally, the client computing device 102 may include one or more internal temperature sensors and one or more fans (internal or external) to actively cool internal components (e.g., processor 104, data storage device 106) of the client computing device 102. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a fan noise mitigation program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the fan noise mitigation program 110A, 110B may be a program capable of creating and maintaining a baseline profile including past e-conference call mute behavior of a user and correlations/trends between hardware metrics and fan noise levels of a computing system of the user, identifying fan indicative noise of the computing system of the user that is negatively impacting intelligibility of the user's transmitted audio during an e-conference call, mitigating, either partially or completely, the fan noise when the user is communicating or is unmuted during the e-conference call, determining whether the computing system of the user is at risk of overheating, creating a presenter group of computing systems for users to share applications remotely during an e-conference call, identifying an optimal computing system of the presenter group based on background fan noise, and redirecting the user to switch to an alternative audio input for participation during an e-conference call. The fan noise mitigation program 110A, 110B may be implemented as a stand-alone application or as a plug-in to known e-conference software applications. For example, the fan noise mitigation program 110A, 110B may be a plug-in to the software program 108 which may be an e-conference software application. The user baseline profile generation method is explained in further detail below with respect to FIG. 2. The computer fan noise mitigation method is explained in further detail below with respect to FIG. 3.

Figure 2:
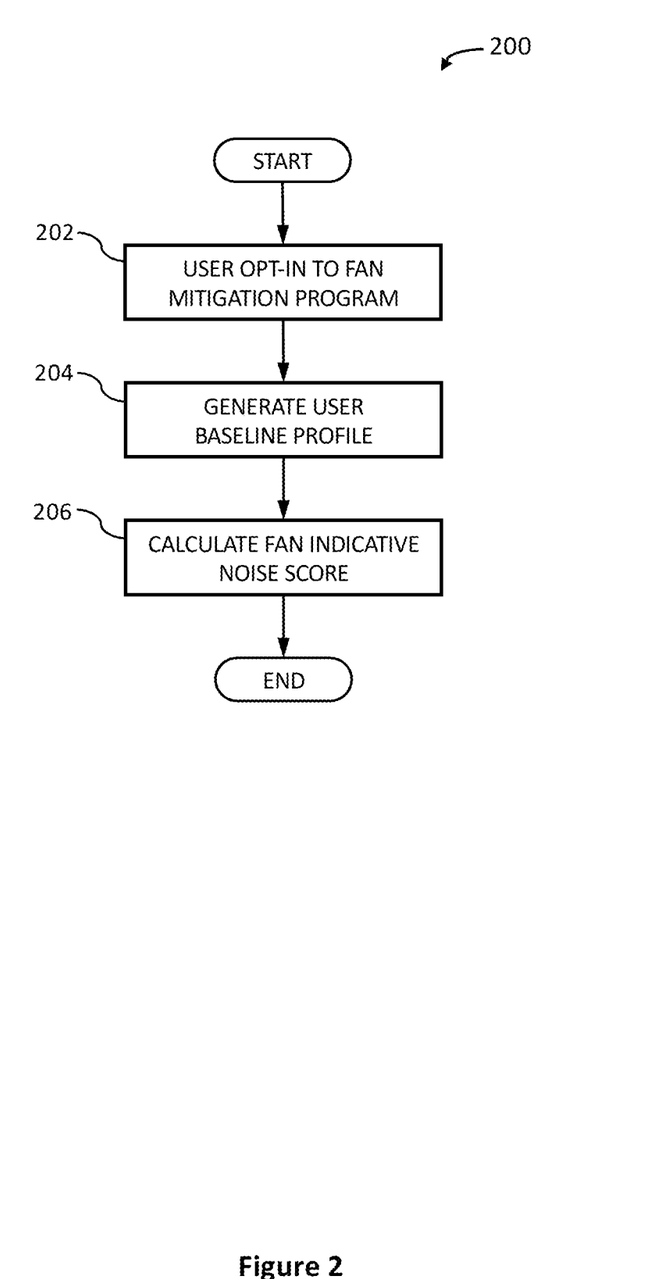
FIG. 2 illustrates an operational flowchart for a user baseline profile generation process according to at least one embodiment.

Referring now to FIG. 2, an operational flowchart for creating a user baseline profile in a user baseline profile generation process 200 is depicted according to at least one embodiment. At 202, the fan mitigation (FM) program 110A, 110B requires a user to opt-in to system usage upon commencement of a user baseline profile generation or commencement of an e-conference call. In an embodiment where the FNM program 110A, 110B is implemented as a plug-in to a known e-conference software application, the FNM program 110A, 110B may require the user to opt-in upon opening the e-conference software application.

At 204, the FNM program 110A, 110B generates a user baseline profile for the user. According to one embodiment, the FNM program 110A, 110B may generate the baseline profile for the user during an e-conference configuration call initiated by the user on a computing device (e.g., a desktop or a laptop). In generating the user baseline profile, the FNM program 110A, 110B observes/identifies hardware and software metrics of the user's computing device during the configuration call. For example, in a scenario in which the user has initiated a configuration call on a laptop, the FNM program 110A, 110B observes spin speeds and dBA levels produced by one or more fans of the laptop to identify an average dBA level produced by the one or more fans during the configuration call. The FNM program 110A, 110B also observes/identifies laptop CPU and/or GPU utilization percentages, laptop memory utilization percentages, open/active software applications and their laptop computing resource utilization percentages, and internal laptop temperatures during the configuration call. From the aforementioned observed hardware and software metrics, the FNM program 110A, 110B may identify correlations between CPU/GPU utilization percentages and laptop fan spin speeds or internal laptop temperatures, correlations between memory utilization percentages and laptop fan spin speeds or internal laptop temperatures, correlations between internal laptop temperatures and laptop fan spin speeds, correlations between internal laptop temperatures and laptop overheating risk levels, correlations between open/active software applications and laptop fan spin speeds, and correlations between laptop fan spin speeds and resulting dBA levels. Observed metrics and identified correlations resulting from the configuration call may be included, by the FNM program 110A, 110B, within the generated user baseline profile for the user. Additionally, the FNM program 110A, 110B may also identify and include, within the generated user baseline profile, information of the user's laptop such as internal hardware specifications, installed software applications, average internal laptop temperature, normal (i.e., within hardware operating tolerance) internal temperature range, critical (i.e., exceeding hardware operating tolerance) internal temperature range, and one or more temperature thresholds for laptop fan activation. The FNM program 110A, 110B may store generated user baseline profiles within data storage device 106 or database 116.

According to at least one further embodiment, the FNM program 110A, 110B may generate, or update, a user baseline profile based on observed hardware/software metrics, identified correlations, observed user behaviors, and identified information of the user's laptop during a real-time e-conference call (i.e., an e-conference call that is not a configuration call). For example, during an e-conference call, other than a configuration call, the FNM program 110A, 110B may observe spot unmuting behavior of a user. Spot unmuting behavior is when a user typically remains on mute during an e-conference call and unmutes only to speak during the call. When spot unmuting behavior is observed, the FNM program 110A, 110B may identify an average period of time the user spends unmuted when speaking. Furthermore, the FNM program 110A, 110B may track observed hardware/software metrics, identified correlations, and observed user behaviors from multiple real-time e-conference calls and generate, or update, a user baseline profile based on the observed/tracked information from one or more real-time e-conference calls. For example, the FNM program 110A, 110B may update a user's existing user baseline profile to include observed spot unmuting behavior and average unmute time or to update hardware/software specifications or identified correlations.

At 206, the FNM program 110A, 110B calculates a baseline fan indicative noise (FIN) score for the e-conference configuration call. The FIN score represents an association between operation of hardware and software components of the user's computing device (e.g., a laptop) and their effect on the intelligibility of the user's transmitted audio during the e-conference call. For example, a FIN score which exceeds a threshold value may be an indication that noise produced by one or more fans of a user's laptop is negatively impacting the ability of a microphone of the user's laptop to capture the user's speech and thus negatively impact the intelligibility, as received by another user or by the FNM program 110A, 110B itself, of the user's transmitted audio during an e-conference call. The FNM program 110A, 110B may base calculation of the baseline FIN score on evaluation of one or more factors including: information within a user's baseline profile as described above; speech communication and laptop fan noise testing between the user and another user on the e-conference configuration call; speech-to-text accuracy of the user's transmitted audio at varying laptop fan spin speeds; and word2vec natural language processing (NLP) of extracted text from the user's transmitted audio. The calculated FIN score for the e-conference configuration call may be included, by the FNM program 110A, 110B, within the generated user baseline profile.

As an illustrative example, when evaluating the speech communication and laptop fan noise testing between the user and another user on the e-conference configuration call, the FNM program 110A, 110B may perform NLP on extracted text from the speech of the two users to identify phrases which indicate a lack of intelligibility of the user's transmitted audio. Such phrases may include, but are not limited to, "I can't hear you", "can you repeat that", or "what did you say". Moreover, repeated phrases between the users may also be an indication of a lack of intelligibility. The NLP on the extracted text from the speech of the two users may be performed as they communicate with each other while one or more fans of the user's laptop spin at varying speeds (e.g., from 0 RPM to a max RPM) as controlled by the FNM program 110A, 110B. Additionally, the FNM program 110A, 110B may identify correlations between increasing utterances of phrases indicating a lack of intelligibility and increasing RPMs of the one or more fans of the user's laptop and may also identify a threshold RPM limit which minimizes or eliminates utterances of phrases indicating a lack of intelligibility.

As another illustrative example, when evaluating the speech-to-text accuracy of the user's transmitted audio at varying laptop fan spin speeds during the e-conference configuration call, the FNM program 110A, 110B may display a test script for the user to read out loud and compare extracted text from the user's audio (i.e., the user's out loud reading) to the test script. The FNM program 110A, 110B may prompt the user to read the test script out loud while one or more fans of the user's laptop spin at varying speeds, as controlled by the FNM program 110A, 110B, and compare those readings to the test script. Additionally, the FNM program 110A, 110B may identify correlations between decreasing accuracy of the user's captured speech-to-text readings and increasing RPMs of the one or more fans of the user's laptop and may also identify a threshold fan RPM limit above which accuracy of the user's captured speech-to-text readings falls below a speech-to-text accuracy threshold due to the negative impact of fan noise on the ability of a microphone of the user's laptop to correctly capture the user's speech.

As yet another illustrative example, the FNM program 110A, 110B may analyze the extracted text of the user's transmitted audio during the e-conference configuration call at varying laptop fan spin speeds utilizing known word2vec NLP techniques. The word2vec algorithm uses a neural network model to learn word associations from a corpus of text. In embodiments of the invention, the corpus of text may include text from users having similar make/model laptops and laptop fan spin speeds. Once trained, the neural network model can detect synonymous words or suggest additional words for a partial sentence. As the name implies, word2vec represents each distinct word with a particular list of numbers called a vector which are chosen carefully such that a simple mathematical function (e.g., the cosine similarity between the vectors) indicates a level of semantic similarity between the words represented by those vectors. The FIN score and the level of semantic similarity may be inversely related.

Figure 3:
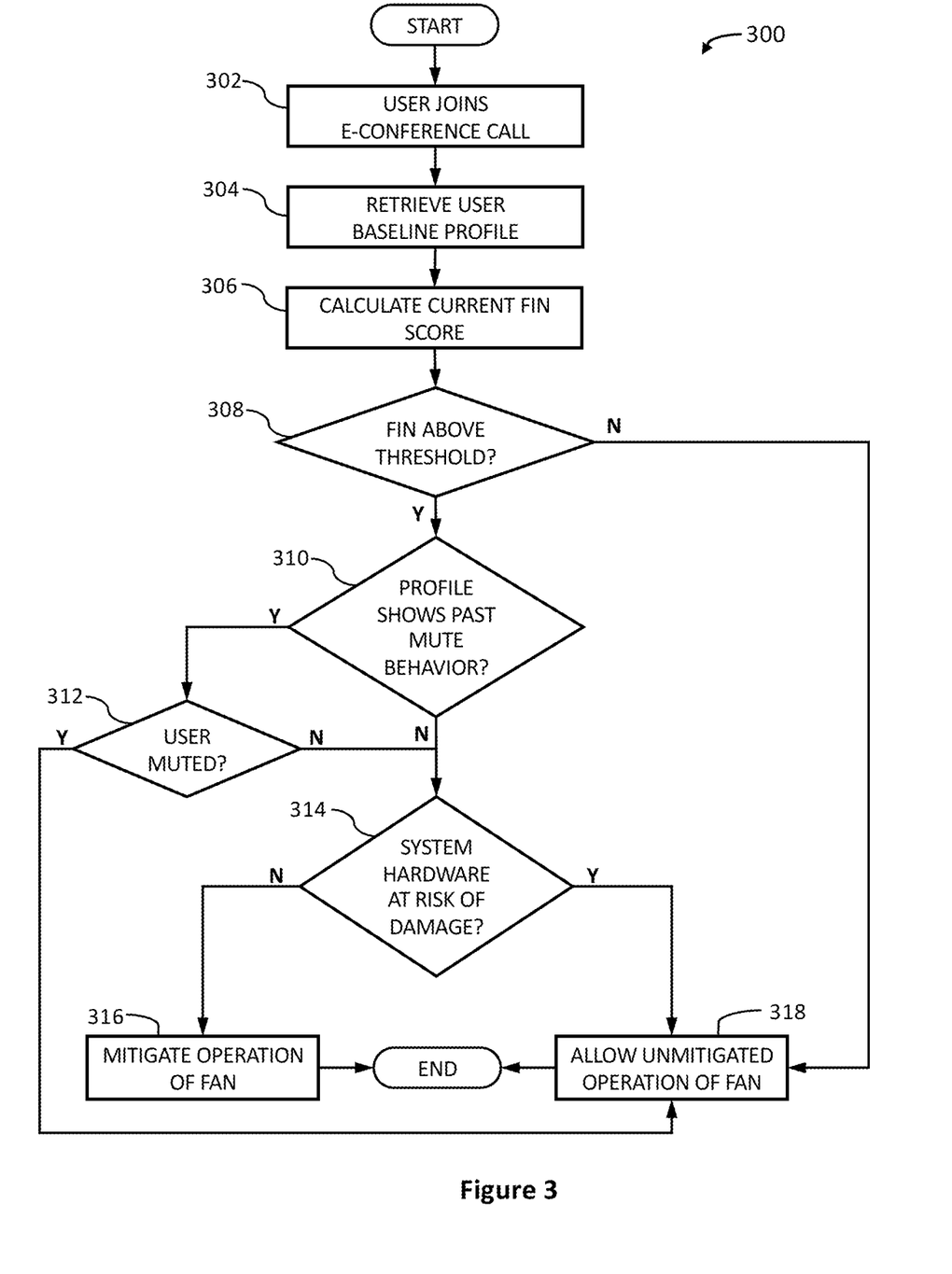
FIG. 3 illustrates an operational flowchart for mitigating computer fan noise during an e-conference call in a computer fan noise mitigation process according to at least one embodiment.

Referring now to FIG. 3, an operational flowchart for mitigating computer fan noise during an e-conference call in a computer fan noise mitigation process 300 is depicted according to at least one embodiment. At 302, a user joins a real-time e-conference call with other users. Upon joining the e-conference call, the FNM program 110A, 110B requires the user to opt-in to system usage. Alternatively, user opt-in may be required upon opening e-conference software in which the FNM program 110A, 110B is implemented as a plug-in or upon installation of the FNM program 110A, 110B.

Next, at 304, the FNM program 110A, 110B retrieves a previously generated user baseline profile for the user. The user baseline profile may be retrieved from data storage device 106 or database 116. According to at least one other embodiment in which the user does not have a retrievable previously generated user baseline profile, the FNM program 110A, 110B generates a real-time user baseline profile for the user based on hardware/software metrics (e.g., laptop fan RPM and resulting dBA level, internal laptop temperature, CPU/GPU/memory utilization, open applications and their computing resource utilizations) and their correlations, user behaviors (e.g., muting behavior), and information of the user's laptop (e.g., hardware specifications, installed software applications, average internal laptop temperature, normal & critical internal temperature ranges, and one or more temperature thresholds for laptop fan activation) identified/observed during the real-time e-conference call. The FNM program 110A, 110B may store the generated real-time user baseline profile within data storage device 106 or database 116 for later retrieval as a previously generated user baseline profile during a future real-time e-conference call of the user. According to at least one further embodiment, the FNM program 110A, 110B may update the retrieved user baseline profile based on information identified/observed during the real-time e-conference call. For example, the FNM program 110A, 110B may update a retrieved user baseline profile to include information relating to spot unmuting behavior of the user observed during the real-time e-conference call or to update the average internal laptop temperature.

At 306, the FNM program 110A, 110B calculates a current FIN score for the real-time e-conference call. The FNM program 110A, 110B may base calculation of the current FIN score on evaluation of one or more factors including: information within the user's retrieved or real-time user baseline profile; hardware/software metrics and information of the user's laptop identified during the real-time call; speech communication between the user and another user on the real-time call; speech-to-text accuracy of the user's transmitted audio at varying laptop fan spin speeds; and word2vec NLP of extracted text from the user's transmitted audio. For example, when evaluating the speech communication between the user and another user, the FNM program 110A, 110B may monitor voice chat between the users, or extracted text from the voice chat, for phrases which indicate a lack of intelligibility of the user's transmitted audio, as the occurrence of such phrases may result in an increased current FIN score. As another example, when evaluating the hardware/software metrics and information of the user's laptop identified during the real-time call, the FNM program 110A, 110B may calculate an increased current FIN score when laptop fan RPM or resulting dBA level is above a threshold value. As yet another example, the FNM program 110A, 110B may calculate an increased current FIN score when word2vec NLP results in a level of semantic similarity which falls below a threshold value. Moreover, any identified correlations between hardware and software metrics which are present within the user's retrieved or real-time user baseline profile may influence the calculation of the current FIN score by the FNM program 110A, 110B. Each factor may be evaluated alone or in combination with each other when calculating the current FIN score.

Next, at 308, the FNM program 110A, 110B determines whether the current FIN score for the real-time e-conference call is above a threshold value. As noted above, the FIN score represents an association between operation of hardware and software components of the user's laptop and their effect on the intelligibility of the user's transmitted audio during the e-conference call. A FIN score which exceeds a threshold value may indicate that noise produced by one or more active fans of the user's laptop (triggered by operation of hardware/software components and increasing internal temperature) is negatively impacting the ability of a microphone of the laptop to capture the user's speech and thus is negatively impacting the intelligibility of the user's transmitted audio as received by another user or by the FNM program 110A, 110B itself. As a non-limiting examples, the threshold value may be a specified dBA level or a specified FIN value. In response to determining that the current FIN score is above the threshold value (step 308, "Y" branch), the computer fan noise mitigation process 300 may proceed to step 310. In response to determining that the current FIN score is not above the threshold value (step 308, "N" branch), the computer fan noise mitigation process 300 may proceed to step 318.

At 310, the FNM program 110A, 110B determines whether the user's retrieved or real-time user baseline profile indicates observed spot unmuting behavior and a corresponding average unmute time for spot voiced statements of the user. In response to determining that the retrieved or real-time user baseline profile indicates observed spot unmuting behavior of the user (step 310, "Y" branch), the computer fan noise mitigation process 300 may proceed to step 312. In response to determining that the retrieved or real-time user baseline profile does not indicate observed spot unmuting behavior of the user, for instance the user typically remains unmuted during an e-conference call, (step 310, "N" branch), the computer fan noise mitigation process 300 may proceed to step 314.

At 312, the FNM program 110A, 110B determines whether the user is currently muted (i.e., a microphone of the user's computing device is muted) during the real-time e-conference call. In response to determining that the user is currently muted (step 312, "Y" branch), the computer fan noise mitigation process 300 may proceed to step 318. In response to determining that the user is not currently muted, for instance the user is making a spot statement, (step 312, "N" branch), the computer fan noise mitigation process 300 may proceed to step 314.

Next at 314, the FNM program 110A, 110B determines whether hardware of the user's laptop is at risk of damage due to overheating before potentially mitigating the noise produced by one or more fans of the laptop. In making this determination, the FNM program 110A, 110B identifies and analyzes real-time information of the laptop including laptop fan RPM, internal laptop temperature, CPU/GPU/memory utilization, open applications and their computing resource utilizations, hardware specifications, average internal laptop temperature, normal & critical internal temperature ranges, and one or more temperature thresholds for laptop fan activation. The FNM program 110A, 110B may additionally analyze information within the user's retrieved or real-time user baseline profile (e.g., identified correlations/trends between hardware and software metrics, average unmute time for spot voiced statements of the user). For example, the FNM program 110A, 110B may reference correlations between CPU/GPU/memory utilization percentages and laptop fan RPM or internal laptop temperature, correlations between internal laptop temperatures and laptop fan RPMs, correlations between internal laptop temperatures and laptop overheating risk levels, and correlations between open/active software applications and laptop fan RPMs when determining an overheating risk of the laptop. The FNM program 110A, 110B may additionally determine if the average unmute time for spot voiced statements of the user exceeds a threshold amount of fan noise mitigation time (i.e., an amount of time fan noise mitigation is performed by the FNM program 110A, 110B) above which the user's laptop may overheat. In response to determining that the hardware of the user's laptop is at risk of damage due to overheating (step 314, "Y" branch), the computer fan noise mitigation process 300 may proceed to step 318. In response to determining that the hardware of the user's laptop is not at risk of damage due to overheating (step 314, "N" branch), the computer fan noise mitigation process 300 may proceed to step 316.

At 316, the FNM program 110A, 110B mitigates the noise produced by one or more fans of the user's laptop by partially, or completely, limiting their operation (i.e., reducing the RPMs of the one or more fans) while the user is speaking during the real-time e-conference call. When partially limiting operation of the one or more fans, the FNM program 110A, 110B may run the fan(s) at an RPM which produces a dBA level, or corresponding FIN score, that is below a threshold value. According to at least one other embodiment, the FNM program 110A, 110B may also identify one or more software applications currently open on the user's laptop having a computing resource (e.g., CPU/GPU/memory) utilization percentage which exceeds a threshold value and decrease the computing resource utilization of one or more of the identified software applications, as these software applications may be strongly contributing to laptop fan usage and resulting RPM levels. The FNM program 110A, 110B may prompt the user for confirmation before decreasing computing resource utilization of an identified software application. Moreover, the FNM program 110A, 110B may prompt the user to shut down one or more of the identified applications if the user has not interacted with them for more than a threshold amount of time. According to at least one further embodiment, the FNM program 110A, 110B may cease or limit mitigation of the noise produced by one or more fans of the user's laptop (i.e., allow for normal or partial fan operation) in response to the user re-muting a microphone of the laptop or in response to internal laptop temperature entering a critical internal temperature range. For example, the FNM program 110A, 110B may limit the RPM of one or more laptop fans to a minimum speed which allows for cooling within the laptop.

At 318, the FNM program 110A, 110B allows for unmitigated (i.e., normal) operation of one or more fans of the user's laptop in response to determining that the calculated current FIN score for the real-time e-conference call fell below the threshold value, or in response to determining that hardware of the user's laptop is at risk of damage due to overheating, or in response to determining that the user is currently muted.

It may be appreciated that FIG. 2 and FIG. 3 provide only an illustration of one implementation and do not imply any limitations with regard to how different embodiments may be implemented. Many modifications to the depicted environments may be made based on design and implementation requirements.

According to a further embodiment, the FNM program 110A, 110B may be added to an e-conference software solution and may allow for the creation of a presenter group of computing devices (e.g., laptops) for users to share and control applications remotely within an e-conference. At a scheduled interval prior to an e-conference call, or in real-time, the FNM program 110A, 110B may evaluate each system within the presenter group to determine, for each system, an active fan decibel level and a fan trigger temperature (i.e., a temperature which activates the fan). Based on the evaluation of each systems' active fan decibel level and fan trigger temperature, the FNM program 110A, 110B may identify and select a single computing device of the presenter group as an optimal computing device to present from during the e-conference call. The optimal computing device of the presenter group may be the computing device having the lowest fan decibel level and thus allow a user to speak without interfering background fan noise. Furthermore, in instances where background fan noise of the optimal computing device is determined to exceed a threshold value, the FNM program 110A, 110B may identify another optimal computing device of the presenter group or may redirect the user of the optimal computing device from the computing device mic audio input to a phone/headset audio input for the e-conference call; thereby minimizing the background fan noise level.

Figure 4:
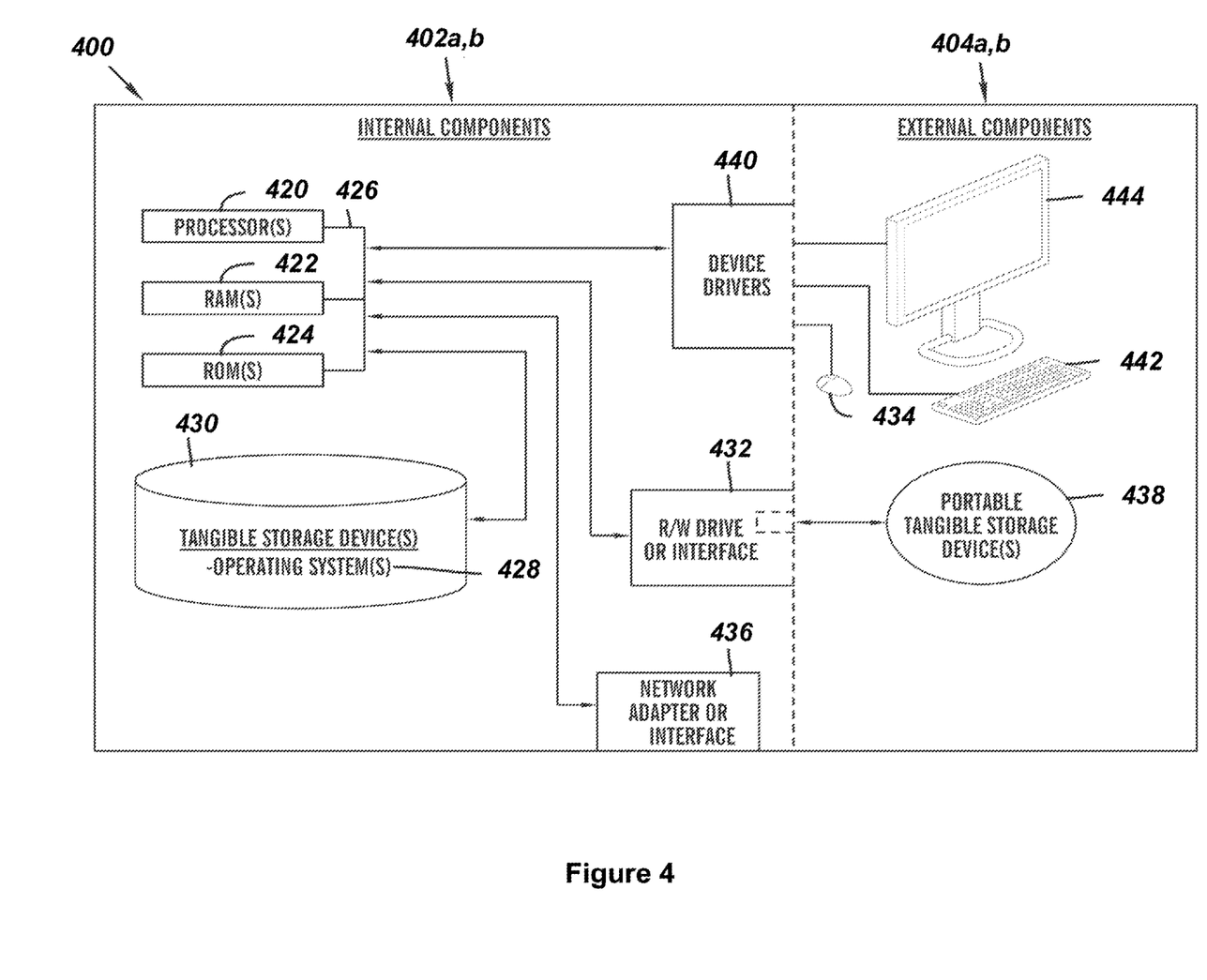
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the FNM program 110A in the client computing device 102, and the FNM program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the FNM program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the FNM program 110A in the client computing device 102 and the FNM program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the FNM program 110A in the client computing device 102 and the FNM program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
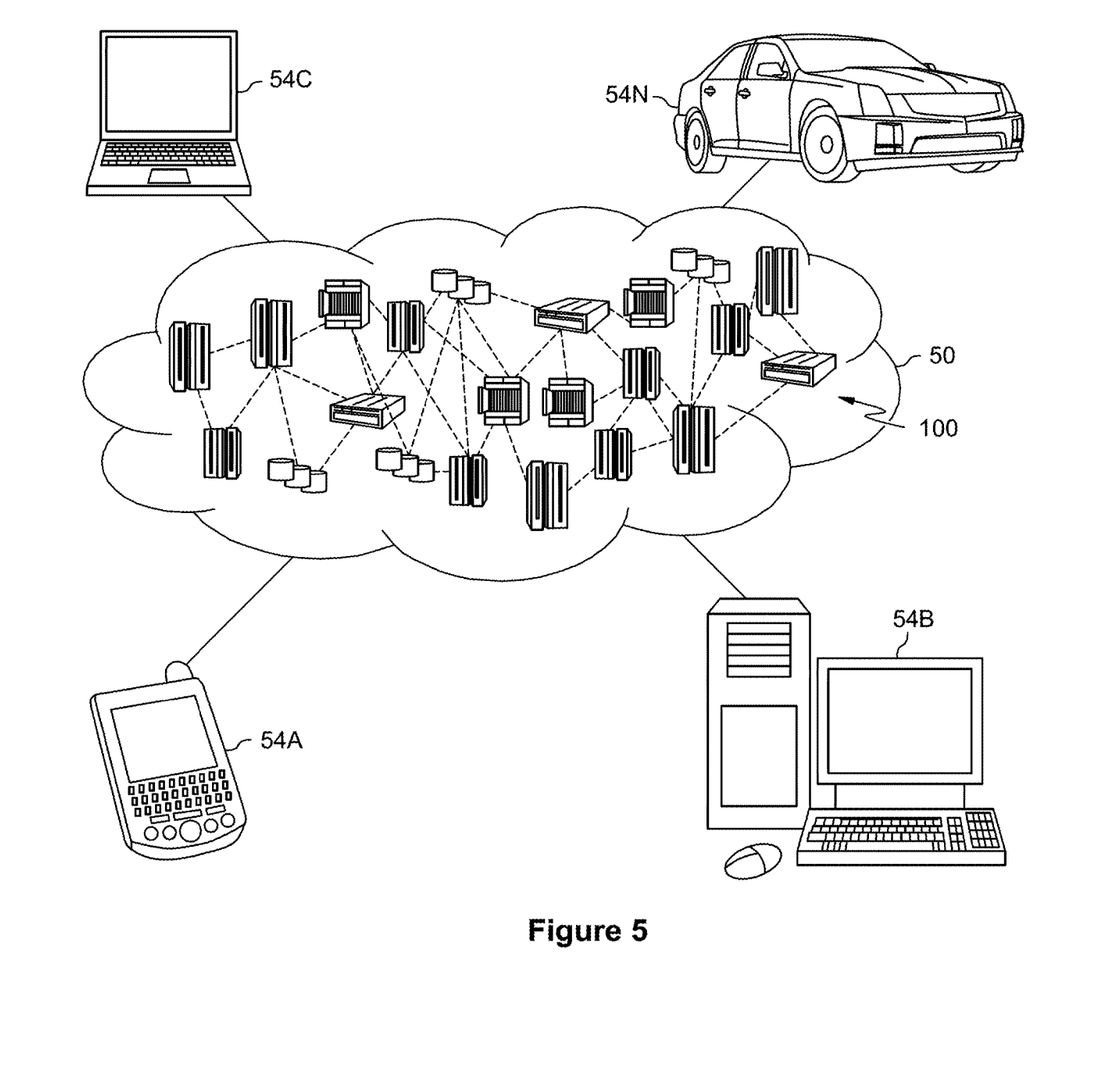
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
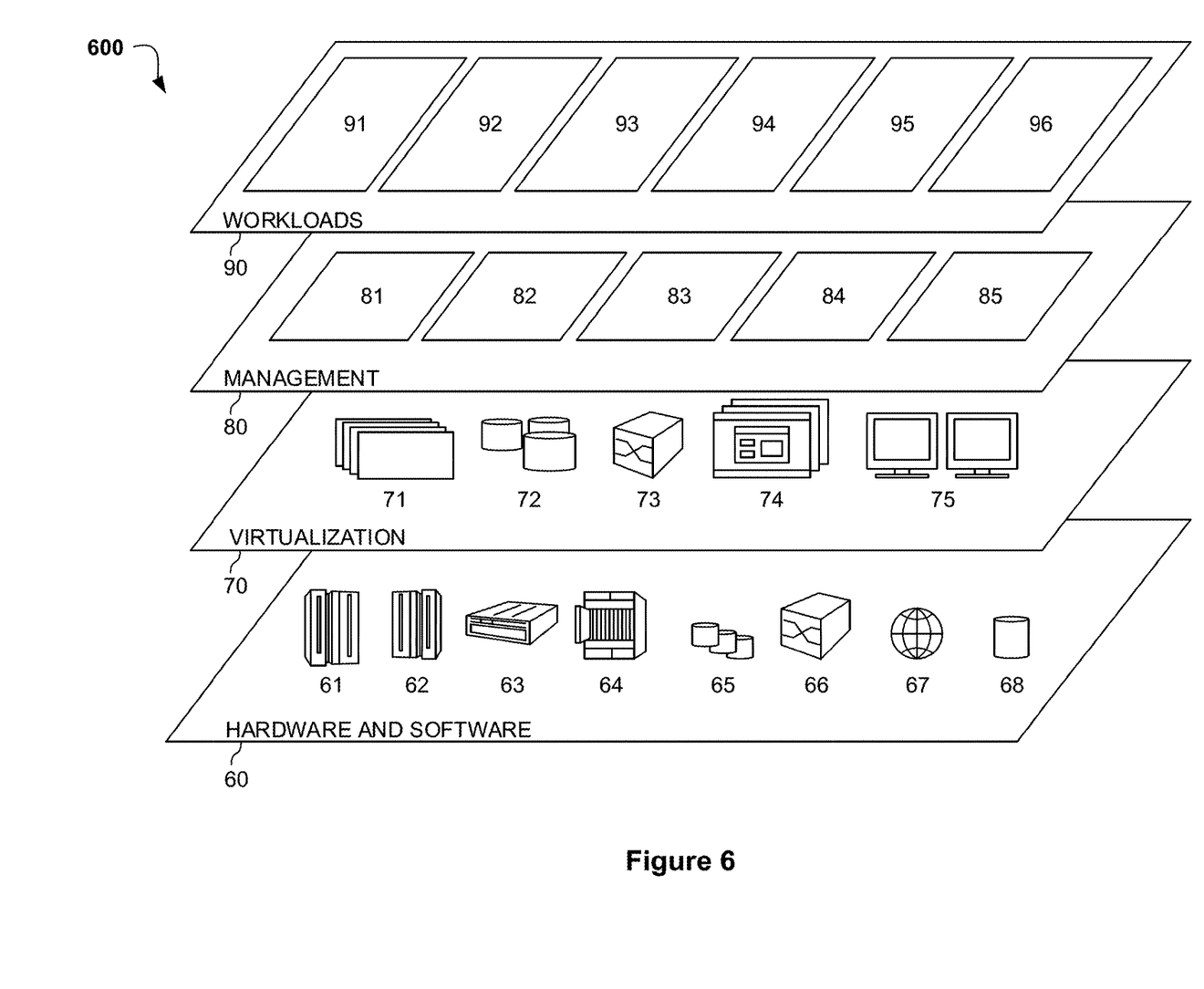
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fan mitigation 96. Fan mitigation 96 may relate to mitigating computing device fan-based noise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of mitigating fan noise, the method comprising:
retrieving a previously generated baseline profile for a user, wherein the user is participating in a real-time e-conference call via a computing device;
identifying real-time hardware and software metrics of the computing device during the real-time e-conference call;
calculating a current fan indicative noise (FIN) score for the real-time e-conference call based on evaluation of the previously generated baseline profile and the identified real-time hardware and software metrics;
determining whether the current FIN score is above a threshold value;
in response to determining that the current FIN score is above a threshold value, determining whether the computing device is at risk of damage;
limiting operation of one or more fans of the computing device in response to a determination that the computing device is not at risk of damage, wherein limiting operation of the one or more fans comprises reducing respective revolutions per minute (RPM) speeds of the one or more fans during the real-time e-conference call; and
updating the previously generated baseline profile based on any observed spot unmuting behavior of the user and the identified real-time hardware and software metrics of the computing device during the real-time e-conference call.

2. The method of claim 1, further comprising:
identifying hardware and software metrics of the computing device during an e-conference configuration call, wherein the hardware and software metrics comprise computing device fan spin speeds and corresponding decibel (dBA) levels, an average dBA level produced by one or more fans of the computing device, central processing unit (CPU) utilization percentages, graphics processing unit (GPU) utilization percentages, memory utilization percentages, open software applications and corresponding computing resource utilization percentages, and internal temperatures of the computing device;
identifying correlations between the identified hardware and software metrics;
generating the previously generated baseline profile for the user based on the identified hardware and software metrics, the identified correlations, and information of the computing device, wherein information of the computing device comprises hardware specifications, installed software applications, an average internal computing device temperature, a normal internal temperature range, a critical internal temperature range, and one or more temperature thresholds for computing device fan activation; and
calculating a baseline FIN score for the e-conference configuration call based on the previously generated baseline profile.

3. The method of claim 1, further comprising:
determining whether the previously generated baseline profile indicates spot unmuting behavior of the user;
in response to determining that the previously generated baseline profile indicates spot unmuting behavior, determining whether a microphone of the computing device is muted during the real-time e-conference call;
in response to determining that the microphone is not muted, determining whether the computing device is at risk of damage; and
in response to determining that the computing device is not at risk of damage, limiting operation of one or more fans of the computing device.

4. The method of claim 1, further comprising:
generating a real-time baseline profile for the user when the previously generated baseline profile is not retrievable;
calculating the current FIN score for the real-time e-conference call based on the real-time baseline profile and the identified real-time hardware and software metrics; and
storing the real-time baseline profile as the previously generated baseline profile for retrieval during a future real-time e-conference call of the user.

5. The method of claim 1, wherein calculating the current FIN score further comprises evaluation of one or more factors selected from the group consisting of speech communication between the user and another user on the real-time e-conference call, speech-to-text accuracy of transmitted audio of the user at varying computing device fan spin speeds, and word2vec natural language processing of extracted text from the transmitted audio of the user.

6. The method of claim 1, wherein the risk of damage comprises overheating of hardware components of the computing device.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
retrieving a previously generated baseline profile for a user, wherein the user is participating in a real-time e-conference call via a computing device;
identifying real-time hardware and software metrics of the computing device during the real-time e-conference call;
calculating a current fan indicative noise (FIN) score for the real-time e-conference call based on evaluation of the previously generated baseline profile and the identified real-time hardware and software metrics;
determining whether the current FIN score is above a threshold value;
in response to determining that the current FIN score is above a threshold value, determining whether the computing device is at risk of damage;
limiting operation of one or more fans of the computing device in response to a determination that the computing device is not at risk of damage, wherein limiting operation of the one or more fans comprises reducing respective revolutions per minute (RPM) speeds of the one or more fans during the real-time e-conference call; and
updating the previously generated baseline profile based on any observed spot unmuting behavior of the user and the identified real-time hardware and software metrics of the computing device during the real-time e-conference call.

8. The computer system of claim 7, further comprising:
identifying hardware and software metrics of the computing device during an e-conference configuration call, wherein the hardware and software metrics comprise computing device fan spin speeds and corresponding decibel (dBA) levels, an average dBA level produced by one or more fans of the computing device, central processing unit (CPU) utilization percentages, graphics processing unit (GPU) utilization percentages, memory utilization percentages, open software applications and corresponding computing resource utilization percentages, and internal temperatures of the computing device;
identifying correlations between the identified hardware and software metrics;
generating the previously generated baseline profile for the user based on the identified hardware and software metrics, the identified correlations, and information of the computing device, wherein information of the computing device comprises hardware specifications, installed software applications, an average internal computing device temperature, a normal internal temperature range, a critical internal temperature range, and one or more temperature thresholds for computing device fan activation; and
calculating a baseline FIN score for the e-conference configuration call based on the previously generated baseline profile.

9. The computer system of claim 7, further comprising:
determining whether the previously generated baseline profile indicates spot unmuting behavior of the user;
in response to determining that the previously generated baseline profile indicates spot unmuting behavior, determining whether a microphone of the computing device is muted during the real-time e-conference call;
in response to determining that the microphone is not muted, determining whether the computing device is at risk of damage; and
in response to determining that the computing device is not at risk of damage, limiting operation of one or more fans of the computing device.

10. The computer system of claim 9, further comprising:
generating a real-time baseline profile for the user when the previously generated baseline profile is not retrievable;
calculating the current FIN score for the real-time e-conference call based on the real-time baseline profile and the identified real-time hardware and software metrics; and
storing the real-time baseline profile as the previously generated baseline profile for retrieval during a future real-time e-conference call of the user.

11. The computer system of claim 7, wherein calculating the current FIN score further comprises evaluation of one or more factors selected from the group consisting of speech communication between the user and another user on the real-time e-conference call, speech-to-text accuracy of transmitted audio of the user at varying computing device fan spin speeds, and word2vec natural language processing of extracted text from the transmitted audio of the user.

12. The computer system of claim 7, wherein the risk of damage comprises overheating of hardware components of the computing device.

13. A computer program product, the computer program product comprising:
one or more computer-readable storage medium and program instructions stored on at least one of the one or more computer-readable storage medium, the program instructions executable by a processor capable of performing a method, the method comprising:
retrieving a previously generated baseline profile for a user, wherein the user is participating in a real-time e-conference call via a computing device;
identifying real-time hardware and software metrics of the computing device during the real-time e-conference call;
calculating a current fan indicative noise (FIN) score for the real-time e-conference call based on evaluation of the previously generated baseline profile and the identified real-time hardware and software metrics;
determining whether the current FIN score is above a threshold value;
in response to determining that the current FIN score is above a threshold value, determining whether the computing device is at risk of damage;
limiting operation of one or more fans of the computing device in response to a determination that the computing device is not at risk of damage, wherein limiting operation of the one or more fans comprises reducing respective revolutions per minute (RPM) speeds of the one or more fans during the real-time e-conference call; and
updating the previously generated baseline profile based on any observed spot unmuting behavior of the user and the identified real-time hardware and software metrics of the computing device during the real-time e-conference call.

14. The computer program product of claim 13, further comprising:
identifying hardware and software metrics of the computing device during an e-conference configuration call, wherein the hardware and software metrics comprise computing device fan spin speeds and corresponding decibel (dBA) levels, an average dBA level produced by one or more fans of the computing device, central processing unit (CPU) utilization percentages, graphics processing unit (GPU) utilization percentages, memory utilization percentages, open software applications and corresponding computing resource utilization percentages, and internal temperatures of the computing device;
identifying correlations between the identified hardware and software metrics;
generating the previously generated baseline profile for the user based on the identified hardware and software metrics, the identified correlations, and information of the computing device, wherein information of the computing device comprises hardware specifications, installed software applications, an average internal computing device temperature, a normal internal temperature range, a critical internal temperature range, and one or more temperature thresholds for computing device fan activation; and
calculating a baseline FIN score for the e-conference configuration call based on the previously generated baseline profile.

15. The computer program product of claim 13, further comprising:
determining whether the previously generated baseline profile indicates spot unmuting behavior of the user;
in response to determining that the previously generated baseline profile indicates spot unmuting behavior, determining whether a microphone of the computing device is muted during the real-time e-conference call;

in response to determining that the microphone is not muted, determining whether the computing device is at risk of damage; and in response to determining that the computing device is not at risk of damage, limiting operation of one or more fans of the computing device.

16. The computer program product of claim 15, further comprising:

generating a real-time baseline profile for the user when the previously generated baseline profile is not retrievable;

calculating the current FIN score for the real-time e-conference call based on the real-time baseline profile and the identified real-time hardware and software metrics; and storing the real-time baseline profile as the previously generated baseline profile for retrieval during a future real-time e-conference call of the user.

17. The computer program product of claim 13, wherein calculating the current FIN score further comprises evaluation of one or more factors selected from the group consisting of speech communication between the user and another user on the real-time e-conference call, speech-to-text accuracy of transmitted audio of the user at varying computing device fan spin speeds, and word2vec natural language processing of extracted text from the transmitted audio of the user.

* * * * *